(12) United States Patent
Shoya et al.

(10) Patent No.: US 7,797,619 B2
(45) Date of Patent: Sep. 14, 2010

(54) TASK ANALYSIS SYSTEM, TASK ANALYSIS DEVICE, TASK MANAGEMENT APPARATUS, DOCUMENT DISPLAY, COMPUTER READABLE MEDIUM, METHOD OF TASK ANALYSIS, AND COMPUTER DATA SIGNAL

(75) Inventors: Tomoyuki Shoya, Kanagawa (JP); Minoru Koshimizu, Kanagawa (JP); Yoshitsugu Hirose, Kanagawa (JP); Toshiroh Shimada, Kanagawa (JP); Shigehiko Sasaki, Kanagawa (JP); Kiwame Tokai, Kanagawa (JP); Hiroyuki Hattori, Kanagawa (JP); Hiroshi Ishikawa, Kanagawa (JP); Sho Hasegawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1000 days.

(21) Appl. No.: 11/504,688

(22) Filed: Aug. 16, 2006

(65) Prior Publication Data

US 2007/0164927 A1    Jul. 19, 2007

(30) Foreign Application Priority Data

Jan. 17, 2006   (JP)   ............................. 2006-008420

(51) Int. Cl.
G06F 17/00   (2006.01)
(52) U.S. Cl. ...................................... 715/201; 715/273
(58) Field of Classification Search ............... 358/1.13; 715/200, 201, 202, 204, 205, 255, 273; 382/100, 382/181, 189, 325
See application file for complete search history.

(56) References Cited

U.S. PATENT DOCUMENTS

| | | | | |
|---|---|---|---|---|
| 5,949,554 A | * | 9/1999 | Melen | 358/448 |
| 6,826,594 B1 | * | 11/2004 | Pettersen | 709/203 |
| 6,956,662 B1 | * | 10/2005 | Kamimura | 358/1.15 |
| 7,380,708 B1 | * | 6/2008 | Kiliccote | 235/380 |
| 7,562,029 B2 | * | 7/2009 | Majd et al. | 705/8 |
| 2004/0236714 A1 | * | 11/2004 | Eisenberger et al. | 707/1 |
| 2005/0007612 A1 | * | 1/2005 | Bourret | 358/1.11 |
| 2005/0076005 A1 | * | 4/2005 | Chefalas et al. | 707/2 |
| 2005/0128492 A1 | * | 6/2005 | Watanabe | 358/1.1 |
| 2006/0043173 A1 | * | 3/2006 | Weaver | 235/380 |
| 2006/0274351 A1 | * | 12/2006 | Daos et al. | 358/1.14 |
| 2007/0081184 A1 | * | 4/2007 | Daos et al. | 358/1.15 |
| 2007/0156730 A1 | * | 7/2007 | Rothermel et al. | 707/101 |
| 2008/0021757 A1 | * | 1/2008 | Majd et al. | 705/8 |

FOREIGN PATENT DOCUMENTS

JP       A 7-121529       5/1995

\* cited by examiner

*Primary Examiner*—Laurie Ries
(74) *Attorney, Agent, or Firm*—Oliff & Berridge, PLC

(57) ABSTRACT

A task analysis system includes: a document display that displays a document image and retains unit identification information identifying the document display itself; and a task management apparatus that manages a task, the task management apparatus including: a task associating unit that previously determines the unit identification information of the document display used to carry out the task; a acquisition unit that acquires the unit identification information and document identification information of a document displayed on the document display, the document identification information identifying the document; and a task analysis unit that determines the document used to carry out the task based on the document identification information, the document identification information being acquired corresponding to the unit identification information determined in the task associating unit.

6 Claims, 5 Drawing Sheets

FIG. 3A
| TASK ID | UNIT ID |
|---------|---------|
| t1 | A, B |
| t2 | C |
| t3 | D |
| ⋮ | ⋮ |
FIG. 3B
| TASK ID | EPID |
|---------|------|
| t1 | a1, a2, a3 |
| t2 | b1 |
| t3 | b2, b3 |
| ⋮ | ⋮ |
FIG. 4
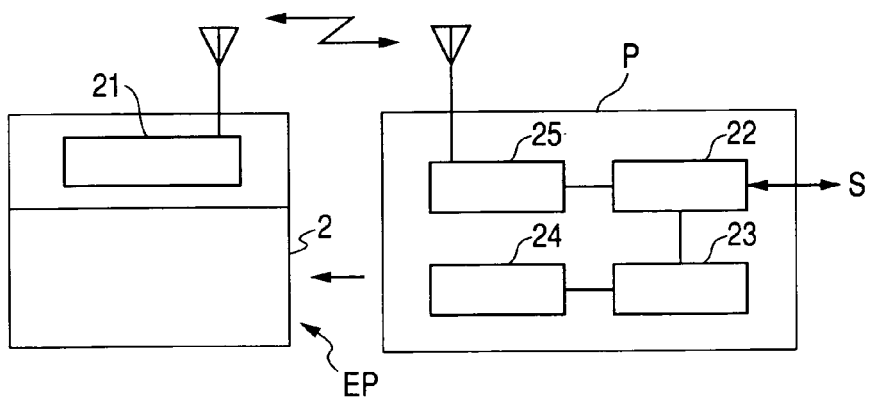
FIG. 5
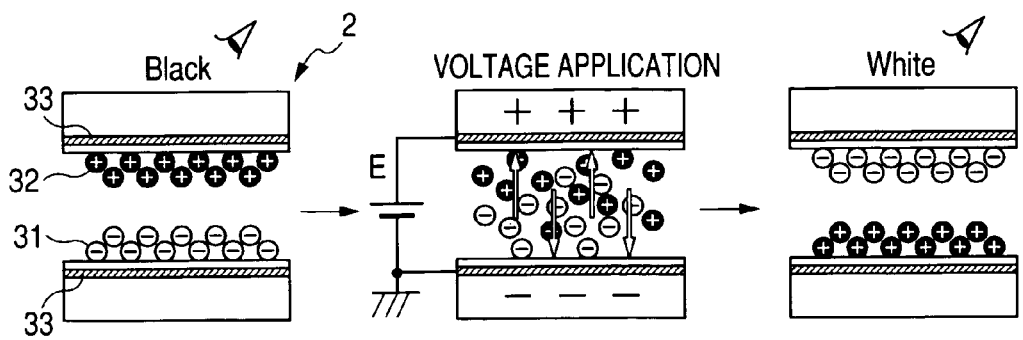

TASK ANALYSIS SYSTEM, TASK ANALYSIS DEVICE, TASK MANAGEMENT APPARATUS, DOCUMENT DISPLAY, COMPUTER READABLE MEDIUM, METHOD OF TASK ANALYSIS, AND COMPUTER DATA SIGNAL

BACKGROUND

1. Technical Field

This invention relates to an art of previously associating a task and a document display used for carrying out the task in association with each other, thereby determining the document used to carry out the task.

2. Related Art

Hitherto, an attempt has been made to relate a task determined to obtain one result (for example, a job unit having use, application, purpose, etc., such as operation or work) and the document used to carry out the task to each other. For example, to start a new task, a workspace of an electronic work environment to execute the task is opened and the user stores the document used to carry out the task in the workspace, whereby the task and the document are related to each other.

The task and the document are thus related to each other, whereby which document was used to carry out the task can be determined and this relation can be used as reference for selecting the document to be used for a similar task.

SUMMARY

According to an aspect of the invention, a task analysis system includes: a document display that displays a document image and retains unit identification information identifying the document display itself; and a task management apparatus that manages a task, the task management apparatus including: a task associating unit that previously determines the unit identification information of the document display used to carry out the task; a acquisition unit that acquires the unit identification information and document identification information of a document displayed on the document display, the document identification information identifying the document; and a task analysis unit that determines the document used to carry out the task based on the document identification information, the document identification information being acquired corresponding to the unit identification information determined in the task associating unit.

That is, the document display used to carry out a task is previously determined in the task associating unit and the document displayed on the document display is related to the task by the task associating unit, so that the document used to carry out the task can be determined.

The invention can be embodied in various forms of not only the task analysis system as described above, but also a method executed by the task analysis system, a task management apparatus forming a part of the task analysis system, a program for causing a computer to serve as a task management apparatus, a document display forming a part of the task analysis system, and the like.

BRIEF DESCRIPTION OF THE DRAWINGS

Exemplary embodiments of the invention will be described in detail based on the following figures, wherein:

FIGS. 3A and 3B are drawings that illustrate an example of a task table according to an exemplary embodiment of the invention;

FIG. 4 is a drawing that illustrates the functional configuration of a task analysis system according to another exemplary embodiment of the invention;

FIG. 5 is a drawing that illustrates the operation principle of self-write type electronic paper;

DETAILED DESCRIPTION

The invention will be discussed specifically based on exemplary embodiments.

Figure 1:
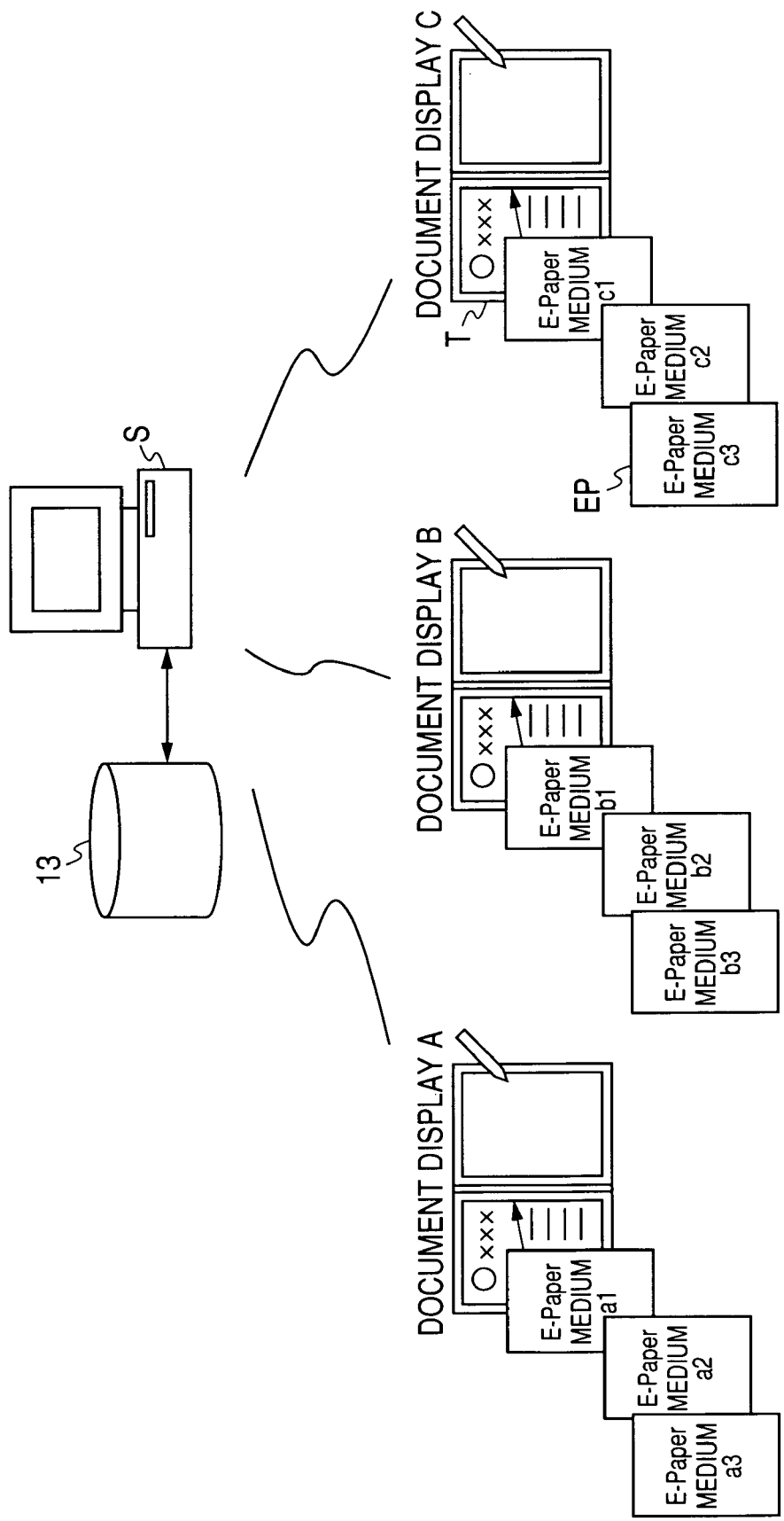
FIG. 1 is a schematic drawing that illustrates a task analysis system according to an exemplary embodiment of the invention.

FIG. 1 illustrates a general configuration example of a task analysis system according to one embodiment of the invention.

The system of the embodiment is made up of a server (task management apparatus) S including a document management DB 13 for managing documents and a plural document displays T for conducting information communications with the server S. In the embodiment, the server S and each document display T conduct wireless communications with each other, but may be connected by a network cable for conducting communications.

The document display T of the embodiment is made up of a processing section 1 and a display section 2 (electronic paper EP) connected detachably to the processing section (processor) 1.

The electronic paper EP is paper-like flexible thin display medium capable of holding display of an image in a no-power supply state and can be connected to the processing section of the document display T detachably like a binder; for example, the document display T enables the user to detach electronic paper EP to which an electronic document is written and pass it to another user or attach electronic paper EP received from another user to the document display T for sharing the documents.

Figure 2:
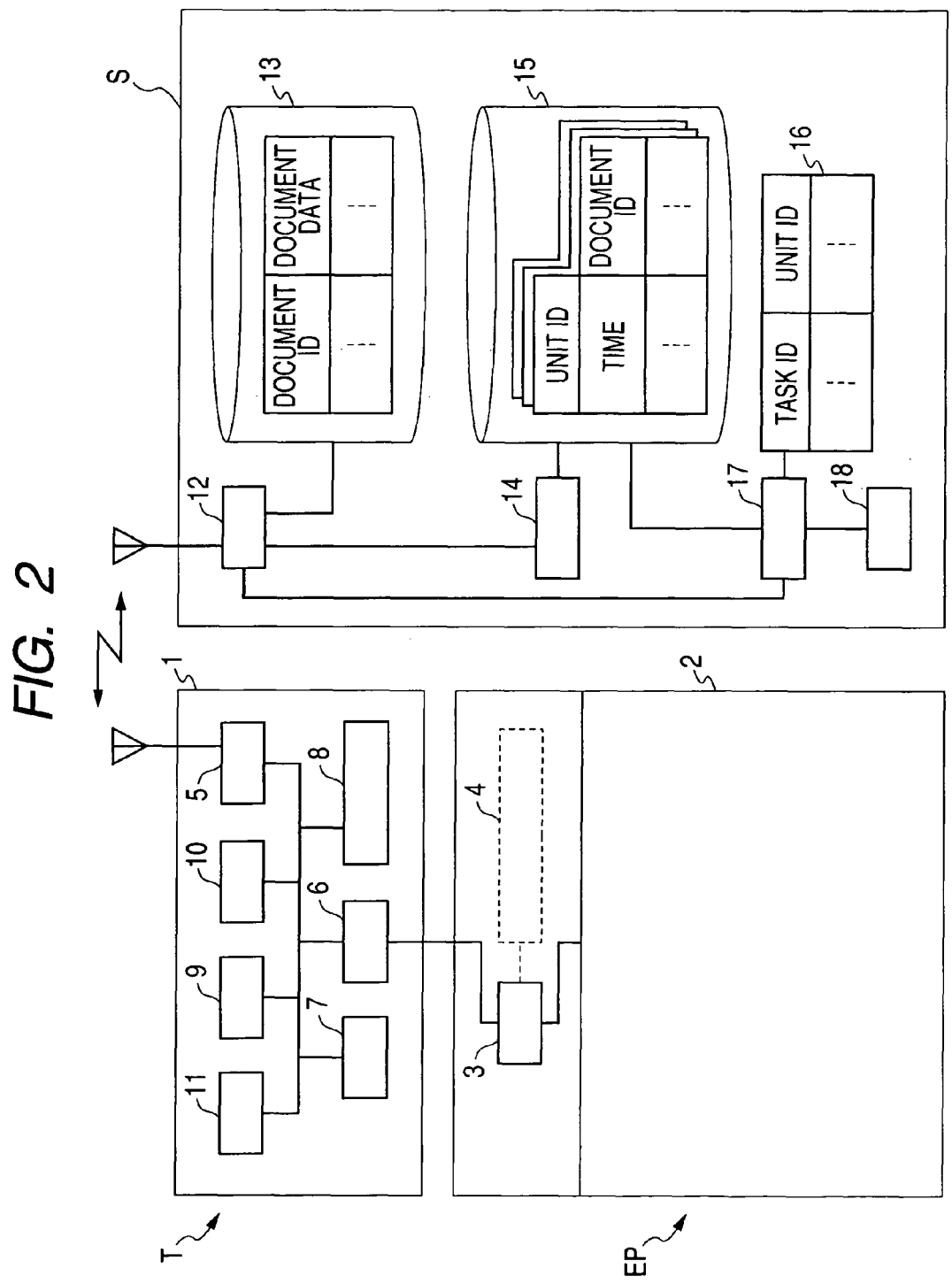
FIG. 2 is a drawing that illustrates the functional configuration of the task analysis system according to an exemplary embodiment of the invention.

FIG. 2 illustrates the functions of the components making up the task analysis system of the embodiment.

The document display T is made up of the processing section 1 and the display section 2 (electronic paper EP) as described above and the processing section 1 and the display section 2 are connected by a connection section 6 of the processing section 1 and a connection section 3 of the electronic paper EP.

The processing section 1 includes a wireless section 5 for conducting wireless communications with the server S, a driver 7 for controlling the electronic paper EP to rewrite the display section 2, memory 8 for retaining electronic data readably and writably, a processor 9 for performing processing of electronic data, a battery 10 for supplying operation power to the function unit such as the processor 9, and an operation section 11 for accepting user operation as well as the connection section 6 described above. The unit ID of the identification information of the document display T is retained in the memory 8 and the unit ID and the document ID for identifying the document are transmitted to the server S under the control of the processor 9 in response to write and display of a document image to and on the display section 2.

The server S includes a wireless section 12 for conducting wireless communications with each document display T (acquisition unit), the above-mentioned document management DB 13 for storing and managing documents, log generation unit 14 for generating a log associating the unit ID acquired from the document display T and the document ID with each other, log memory 15 for storing the generated log, a task table 16 (task associating unit) previously determining the document display T to be used to carry out the specific task, task analysis unit 17 for determining the document used to carry out a task, and output unit 18 for outputting information concerning the determined document. The function units 14 to 17 are implemented as a program according to the invention is executed by a computer.

The document management DB 13 manages each document ID for identifying each document and the corresponding document data in association with each other, and provides the document data corresponding to the requested document ID for the requesting document display T. In the embodiment, the server S includes the document management DB 13, but the document management DB 13 may be included in another server connected to the system by a network.

The task table 16 previously determines the correspondence as illustrated in FIG. 3A; it determines use of the document display T with unit ID "A" or "B" to carry out task "t1," use of the document display T with unit ID "C" to carry out task "t2," and use of the document display T with unit ID "D" to carry out task "t3." If the user creates a new task, he or she is prompted to select a document display T to be used for the new task, and the correspondence between the task and the unit ID is newly created in the task table 16. When the task is complete, the correspondence between the task and the unit ID is deleted from the task table 16 and the corresponding document display T is released and is restored to a state in which it can be used with any other task.

Next, writing a document image to the display section 2 (electronic paper EP) in the document display T of the embodiment will be discussed.

The embodiment uses self-write type electronic paper EP for rewriting the display image for itself under the control of the processing section 1 of the document display T.

The self-write type electronic paper EP is a flexible thin medium of a size like a card or A4-size paper stipulated in JIS, for example, and has a size responsive to the use.

The processing section 1 of the document display T retains the document data received through the wireless section 5 from the server S in the memory 8 and the processor 9 generates document image data based on the document data retained in the memory 8, drives the driver 7 with electronic paper EP connected to the connection section 6, and controls an electrode provided in the display section 2 of the electronic paper EP in response to the image data for writing and displaying a document image. The electronic paper EP has a function of continuing to hold an image on the display section 2 in a display state if the drive power of the driver 7 is removed, so that the image is held if the electronic paper EP is detached from the processing section 1.

Figure 6:
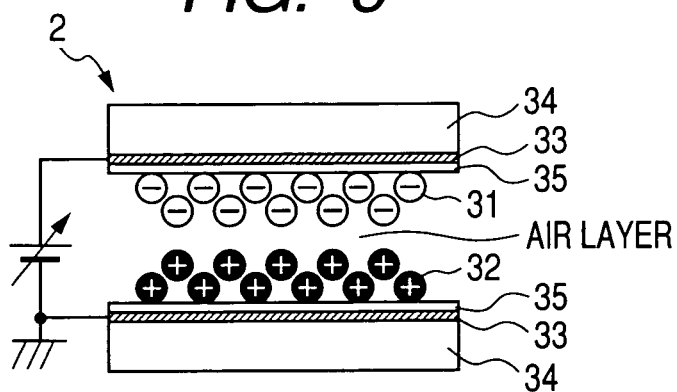
FIG. 6 is a drawing that illustrates the structure of self-write type electronic paper.

The electronic paper EP has a structure wherein fine colored particles used as toner with a copier (in the example illustrated in the figure, white particles 31 and black particles 32) are filled between a pair of surface and back electrodes 33 with at least the surface being transparent and they are sandwiched between a pair of surface and back film substrates 34 with at least the surface being transparent, as illustrated in FIG. 6 representing the cross-sectional structure of the display section 2. An air layer is provided between the electrode layers 33 so as to allow the colored particles 31 and 32 to move freely, and each matrix-like electrode layer 33 is provided with an insulating layer 35 for preventing the electrode layer from coming in contact with the colored particles 31 and 32. Using a color filter, color display can also be realized as a simple structure.

In the electronic paper EP, the negatively (minus) charged white particles 31 remain on the back and the positively (plus) charged black particles 32 remain on the surface in a state in which no voltage is applied to the electrode 33 (however, the electrode 33 is charged in the polarity at the previous drive time) and if the user visually observes the display section 2 from the surface, the display section 2 is placed in a black state, as illustrated in FIG. 5 representing the operation principle of the display section 2. When the electrode 33 is controlled by the driver 7 of the processing section 1 based on electronic data and the polarity of the electrode 33 of the required part of the matrix responsive to the image to be displayed is inverted, the positional relationship between the white particles 31 and the black particles 32 is replaced and an image based on the contrast between the white particles 31 and the black particles 32 is displayed on the display section 2. The electrode 33 is operated based on different image data, whereby image information displayed on the display section 2 based on the contrast between the white particles 31 and the black particles 32 can be switched and the electronic paper EP can be reused repeatedly.

The task analysis system of the embodiment makes it possible to relate the task and the document to each other and determine the document used with the task in response to display of the document image on the display section 2 (electronic paper EP) of the document display T in such a manner.

That is, when the document display T displays the document image on the electronic paper EP, it transmits the unit ID of the document display T stored in the memory 8 and the document ID of the document written to the display section 2 to the server S through the wireless section 8. When the server S receives the unit ID and the document ID in the wireless section 12, if the received unit ID is the unit ID of the document display T related to the task based on the relation between the task and the document display T determined in the task table 16, the task analysis unit 17 determines that the document corresponding to the received document ID was used to carry out the task.

Thus, as the user performs simple operation of displaying a document on the document display T determined about the task, the task and the document used with the task are automatically related to each other and the document is determined the document used to carry out the task.

Since the unit ID and the document ID received in the wireless section 12 are associated with each other by the log generation unit 14 and are stored as a log in the log memory 15, the task analysis unit 17 can reference the log and determine the document used to carry out the task at any desired later timing.

For example, if the correspondence as illustrated in FIG. 3A is determined in the task table 16, use of the document display T with unit ID "A" or "B" is determined for the task "t1" and therefore the document corresponding to the document ID recorded in the log with the unit ID "A" and the document corresponding to the document ID recorded in the log with the unit ID "B" are determined the documents used to carry out the task "t1."

Information of the documents used to carry out the task is output by the output section 18. For example, the document names of the documents used with the task can be listed for each task and can be displayed on a display of an information processing apparatus connected to the system through the network or can be printed out on paper using a printer. For example, the display date and time of each document are recorded in a log, whereby the documents can be listed in the display date and time order or can be listed in the descending order of the number of times each document has been displayed.

Therefore, by checking the output description of the output unit 16, for example, to carry out one task, the user can list the documents used with an executed past task similar to the task for reference to select the documents to be used with the task.

Since the display section 2 (electronic paper EP) can be replaced with another, as electronic paper EP with a document image displayed thereon is connected to the processing section 1 of the document display T, the document display T of the embodiment may determine that a document is displayed on the document display T, and may transmit the unit ID and the document ID to the server S.

That is, electronic paper EP is provided with memory 4 for storing the EPID of the identification information of the electronic paper EP and the document ID of the document displayed on the electronic paper EP as indicated by the dashed line in FIG. 2. The processing section 1 of the document display T reads the EPID and the document ID from the memory 4 and transmits them to the server S in response to connection of the electronic paper EP to the processing section 1. The document ID stored in the memory 4 of the electronic paper EP may be stored when the document display T writes and displays the document image to and on the electronic paper EP.

The relation between each task and electronic paper EP may be determined in the task table 16, as illustrated in FIG. 3B.

According to the figure, use of electronic paper EP with EPID "a1," "a2," "a3" to carry out task "t1," use of electronic paper EP with EPID "b1" to carry out task "t2," and use of electronic paper EP with EPID "b2," "b3" to carry out task "t3" are previously determined.

At this time, electronic paper EP is provided with memory 4 for storing the EPID of the electronic paper EP as indicated by the dashed line in FIG. 2. When writing and displaying a document image to and on the connected electronic paper EP, the processing section 1 of the document display T reads the EPID from the memory 4 and transmits the EPID to the server S together with the document ID of the document.

The task analysis unit 17 of the server S uses the received EPID and document ID and the task table 16 to determine the document used to carry out the task based on the relation between the task and the document.

The relation between each task and electronic paper EP is thus previously determined, whereby the task can be switched by replacing electronic paper EP, and it is made possible to execute plural tasks by replacing the electronic paper EP connected to the document display T.

In the embodiment, the unit made up of the processing section 1 and the display section 2 (electronic paper EP) connected detachably to the processing section 1 is used as the document display T, but the document display T may be any if it can provide the unit ID and the document ID for the server S in response to display of a document image; for example, a mobile information terminal such as a mobile PC or a PDA may be used as the document display T.

The unit ID and the document ID may be provided for the server S in response to creation or editing of a document with the document display T.

Next, another embodiment of the invention will be discussed.

A task analysis system of the embodiment is made up of electronic paper EP, an electronic paper printer P for performing processing for the electronic paper EP, and a server (task management apparatus) S, as illustrated in FIG. 4. The functions of the server S are identical with those previously described with reference to FIG. 2 and therefore will not be discussed again.

The electronic paper EP is made up of a display section 2 for holding display of a document image in a no-power supply state and a storage section 21 for storing the EPID of the electronic paper EP. In the embodiment, known RFID including a wireless communication function of data and a data storage function as a comparatively simple configuration is used as the storage section 21.

The electronic paper printer P includes communication unit 22 for communicating with the server S, image generation unit 23 for generating the image of a document to be written to electronic paper EP, write unit 24 for writing and displaying the generated document image to and on the display section 2 of the electronic paper EP, and a wireless section 25 for wirelessly reading the EPID from the storage section 21 of the electronic paper EP.

The electronic paper printer P sends the EPID read from the storage section 21 of the electronic paper EP in the wireless section 25 to the server S through the communication unit 22 together with the document ID of the document displayed on the display section 2 as the write unit 24 writes and displays the document image to and on the display section 2 of the electronic paper EP. The server S uses the received EPID and document ID and a task table 16 to determine the document used to carry out the task based on the relation between the task and the document.

The task table 16 used with the task analysis system of the embodiment previously determines the relation between each task and electronic paper EP as illustrated in FIG. 3B and it is determined that the document displayed on the electronic paper EP previously determined about the task is the document used to carry out the task.

The embodiment uses optical write type electronic paper EP of one form of transfer write type electronic paper EP. Writing of an image to optical write type electronic paper EP will be discussed with FIGS. 7 to 9.

The optical write type electronic paper EP is a flexible thin medium of a size like a card or A4-size paper stipulated in JIS, for example, and a processing section 43 is provided on a side of a display section 42 (corresponding to the display section 2 in FIG. 4) occupying the most area. The size of the display section 42 is set in response to the use.

The processing section 43 is provided with the above-described storage section 21 and write electrodes 44 for applying voltage for driving the display section 42.

Figure 7:
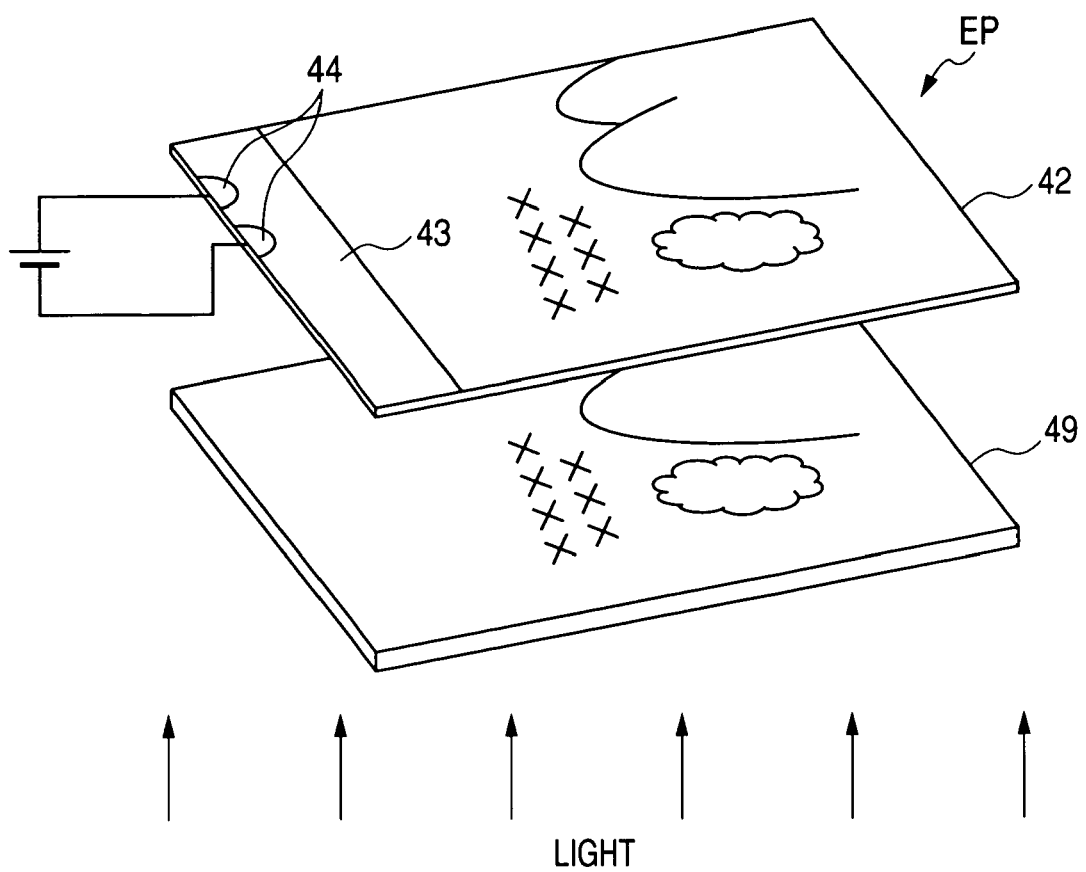
FIG. 7 is a drawing that illustrates the use method of transfer write type electronic paper.

For example, as illustrated in FIG. 7, an image to be written is displayed on a liquid crystal panel 49 and while the voltage from an external power supply is applied to the electrode 44, the optical write type electronic paper EP is put on the liquid crystal panel 49 and light is applied, whereby the image displayed on the liquid crystal panel 49 can be transferred to the display section 42 for storage. In short, the optical write type electronic paper EP has a function of transferring the projected image to the display section 42 as voltage is applied to the electrode 44 and continuing to hold the image in a display state still after the voltage applied to the electrode 44 is removed.

To write an image to such optical write type electronic paper EP, the write unit 24 of the optical paper printer P includes unit required for optical write, such as a voltage application section to the electrode 44, the liquid crystal panel 49, and a light application section.

Figure 9:
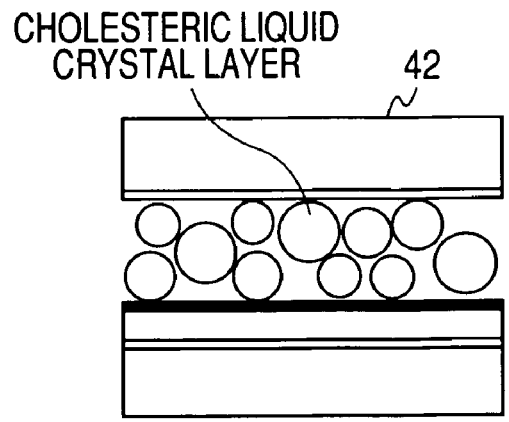
FIG. 9 is a drawing that illustrates the structure of transfer write type electronic paper.

The optical write type electronic paper EP has a structure wherein a layer of organic photoconductive material (organic photoconductive layer) 50 used with a copier and a layer of liquid crystal display material (cholesteric liquid crystal layer put into microcapsules) 51 are used in combination and these layers are sandwiched between a pair of surface and back transparent electrodes 52 and the layered body is sandwiched between a pair of surface and back transparent substrate films 53, as illustrated in FIG. 9 representing the cross-sectional structure of the display section 42. In the structure, monochrome image display can be produced with white display provided by the cholesteric liquid crystal layer 51 reflecting light and black display as light passes through the liquid crystal layer 51 and is absorbed in a black layer 54 provided between the cholesteric liquid crystal layer 51 and the organic photoconductive layer 50. Further, since the cholesteric liquid crystal has a characteristic of interference reflecting of color light responsive to helical pitches, the cholesteric liquid crystal layer 51 is formed by depositing liquid crystal materials different in helical pitch, so that it is also possible to realize color display as a simple structure.

Figure 8:
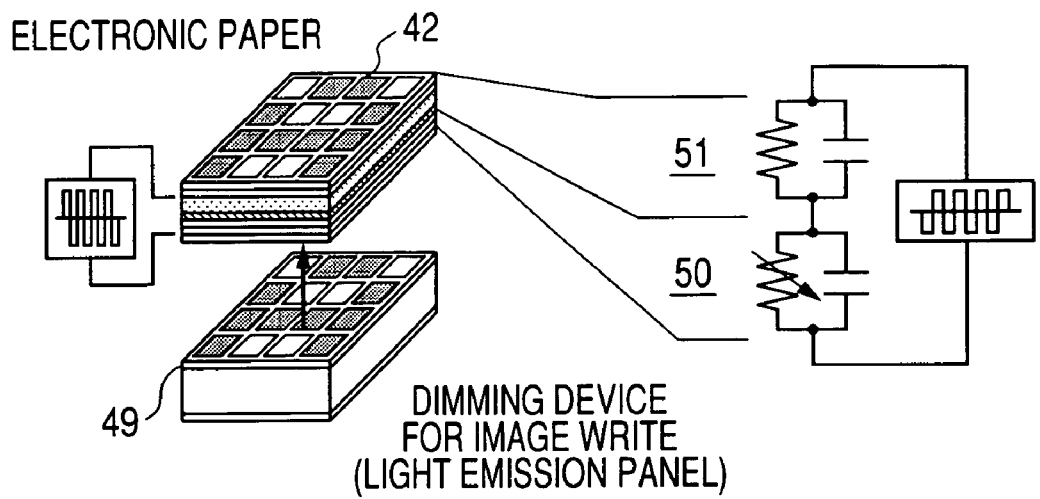
FIG. 8 is a drawing that illustrates the operation principle of transfer write type electronic paper.

For example, an image to be transferred to the dimming device panel for image write (light emission panel) 49 is displayed on the optical write type electronic paper EP and is projected on the display section 42 and when a voltage is applied to the electrode 44, intensity of light is converted into the reflection density in a moment and the projection image is retained, as illustrated in FIG. 8 representing the operation principle of the display section 42. An erasion voltage is applied to the electrode 44, whereby the image information retained in the display section 42 can be erased and the optical write type electronic paper EP can be used repeatedly as write and erasion are repeated. Without performing such erasion processing for the optical write type electronic paper EP, a voltage is applied to the electrode 44 and a new image is projected as described above, whereby the image information retained in the display section 42 can also be overwritten with new information; the optical write type electronic paper EP can be used repeatedly as such overwrite processing is performed.

As another example of the transfer write type electronic paper EP, the display section 42 may have a known thermal transfer structure and an image may be thermally transferred to the display section 42 by a terminal transfer section included in the electronic paper printer P for holding display. The task analysis system may be implemented using such electronic paper EP.

The task analysis system may be implemented using the self-write type electronic paper EP previously described with reference to FIGS. 5 and 6.

What is claimed is:

1. A task analysis system comprising:
   a document display that displays a document image and retains unit identification information identifying the document display itself; and
   a task management apparatus that manages a task, the task management apparatus comprising:
      a task associating unit that previously relates a task with a unit identification information of a carry out document display used to carry out the task;
      an acquisition unit that acquires the unit identification information and document identification information of a document displayed on the document display, the document identification information identifying the document; and
      a task analysis unit that determines the document used to carry out the task based on the document identification information, the document identification information being acquired from the unit identification information, the unit identification information being related with the task in the task associating unit, wherein
   the document display comprises an electronic paper comprising:
      a display that holds display of a document image in a substantially no-power supply state; and
      a memory that stores the unit identification information, and
   the task analysis system comprises an electronic paper printer performing processing for the electronic paper, the electronic paper printer comprising:
      a write unit that displays a document image on the display of the electronic paper;
      a read unit that retrieves the unit identification information from the memory of the electronic paper; and
      a notification unit that notifies the unit identification information and document identification information of the document to the task management apparatus in accordance with writing a document image to the display of the electronic paper, the unit identification information being read from the memory of the electronic paper, and
   the unit identification information and the document identification information acquired by the acquisition unit comprise the unit identification information and the document identification information sent by the notification unit.

2. The task analysis system as claimed in claim 1, wherein
   the task management apparatus comprises:
      a log memory that stores a log associating the unit identification information and document identification information with each other, and
   the task analysis unit determines the document used to carry out the task by referencing the log in the log memory indicating the document identification information, the document identification information being associated with the unit identification information determined in the task associating unit.

3. A task management apparatus comprising:
   a task associating unit that previously relates a task with a unit identification information of a carry out document display used to carry out a task, the unit identification information being retained in a document display;
   an acquisition unit that acquires the unit identification information and document identification information of a document displayed on the document display, the document identification information identifying the document; and
   a task analysis unit that determines the document used to carry out the task based on the document identification information, the document identification information being acquired from the unit identification information, the unit identification information being related with the task in the task associating unit, wherein
   the document display comprises an electronic paper comprising:
      a display that holds display of a document image in a substantially no-power supply state; and a memory that stores the unit identification information, and an electronic paper printer performing processing for the electronic paper, the electronic paper printer including:
  a write unit that displays a document image on the display of the electronic paper;
  a read unit that retrieves the unit identification information from the memory of the electronic paper; and
  a notification unit that notifies the unit identification information and document identification information of the document to the task management apparatus in accordance with writing a document image to the display of the electronic paper, the unit identification information being read from the memory of the electronic paper, and the unit identification information and the document identification information acquired by the acquisition unit comprise the unit identification information and the document identification information sent by the notification unit.

4. A document display providing information for a task management apparatus determining a document used to carry out a task, the task management apparatus previously relating a task with a unit identification information of a carry out document display used to carry out the task, and the document display comprising:
  a providing unit that provides the unit identification information related with the task and document identification information for the task management apparatus in accordance with a document displayed on the document display so as to determine the document used to carry out the task based on the document identification information, the document identification information being acquired from the unit identification information and identifying the document displayed on the document display;
  an electronic paper comprising:
    a display that holds display of a document image in a substantially no-power supply state; and
    a memory that stores the unit identification information, and
  an electronic paper printer performing processing for the electronic paper,
    a write unit that displays a document image on the display of the electronic paper;
    a read unit that retrieves the unit identification information from the memory of the electronic paper; and
    a notification unit that notifies the unit identification information and document identification information of the document to the task management apparatus in accordance with writing a document image to the display of the electronic paper, the unit identification information being read from the memory of the electronic paper, and
  the unit identification information and the document identification information acquired by the acquisition unit comprise the unit identification information and the document identification information sent by the notification unit.

5. A computer readable medium storing a program causing a computer to execute a process for determining a document used to carry out a task based on information acquired from a document display, the document display retaining unit identification information identifying the document display, the process comprising:

previously relating a task with a unit identification information of a carry out document display used to carry out the task;

acquiring the unit identification information and document identification information of a document displayed on the document display, the document identification information identifying the document;

determining the document used to carry out the task based on the document identification information, the document identification information being acquired from the unit identification information, the unit identification information being related with the task in a task associating function, wherein the document display includes an electronic paper;

holding display of a document image in a substantially no-power supply state in a display of the electronic paper; and storing the unit identification information in a memory of the electronic paper;

processing the electronic paper with an electronic printer including:
  displaying a document image on the display of the electronic paper with a write unit;
  retrieving the unit identification information from the memory of the electronic paper; and
  notifying the unit identification information and document identification information of the document to the task management apparatus in accordance with writing a document image to the display of the electronic paper, the unit identification information being read from the memory of the electronic paper, and the acquired unit identification information and document identification information comprising the unit identification information and the document identification information sent by the notification unit.

6. A method of task analysis comprising:

retaining unit identification information identifying a document display;

previously relating a task with a unit identification information of a carry out document display used to carry out a task;

acquiring the unit identification information and document identification information of a document displayed on the document display, the document identification information identifying the document;

determining the document used to carry out the task based on the document identification information, the document identification information being acquired from the unit identification information, the unit identification information being related with the task in the task associating unit; wherein the document display includes an electronic paper;

holding display of a document image in a substantially no-power supply state in a display of the electronic paper; and storing the unit identification information in a memory of the electronic paper;

processing the electronic paper with an electronic printer including:
  displaying a document image on the display of the electronic paper with a write unit;
  retrieving the unit identification information from the memory of the electronic paper; and
  notifying the unit identification information and document identification information of the document to the task management apparatus in accordance with writing a document image to the display of the electronic paper, the unit identification information being read from the memory of the electronic paper, and the acquired unit identification information and document identification information comprising the unit identification information and the document identification information sent by the notification unit.

* * * * *